US009785420B2

(12) United States Patent
Dow et al.

(10) Patent No.: US 9,785,420 B2
(45) Date of Patent: Oct. 10, 2017

(54) ANALYSIS OF SOURCE CODE FOR DEPLOYMENT

(71) Applicant: International Business Machines Corporation, Armonk, NY (US)

(72) Inventors: Eli M. Dow, Wappingers Falls, NY (US); Thomas D. Fitzsimmons, Poughkeepsie, NY (US); Emily M. Metruck, Poughkeepsie, NY (US); Charles J. Stocker, IV, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 56 days.

(21) Appl. No.: 15/041,460

(22) Filed: Feb. 11, 2016

(65) Prior Publication Data
US 2017/0235553 A1    Aug. 17, 2017

(51) Int. Cl.
G06F 9/45    (2006.01)

(52) U.S. Cl.
CPC ..................... *G06F 8/43* (2013.01)

(58) Field of Classification Search
CPC ......... G06F 8/41; G06F 8/447; G06F 9/45516
USPC ....................................................... 717/140
See application file for complete search history.

(56) References Cited

U.S. PATENT DOCUMENTS

| 7,861,217 B2 * | 12/2010 | Ciolfi .................. G06F 17/5009 717/104 |
| 8,543,991 B2 * | 9/2013 | Ramaswamy ...... G06F 9/45516 717/120 |
| 8,924,867 B2 | 12/2014 | Arnold |
| 2004/0153624 A1 * | 8/2004 | Zhou .................... G06F 11/2023 712/4 |
| 2005/0114847 A1 * | 5/2005 | Whalley .................. G06F 8/71 717/140 |
| 2014/0165077 A1 * | 6/2014 | Martinez Canedo ... G06F 8/451 718/105 |
| 2014/0173574 A1 * | 6/2014 | Schmidt .................. G06F 8/427 717/143 |

(Continued)

OTHER PUBLICATIONS

Application Centric Framework to Smart Discover and Adapt Services for Applications, IP.com, May 13, 2014, IPCOM000236720D, IP.com.

(Continued)

*Primary Examiner* — John Chavis
(74) *Attorney, Agent, or Firm* — Cantor Colburn LLP; Steven Chiu

(57) ABSTRACT

A method comprises receiving a source code having a data set with a processor, opening the data set and identifying compile stage dependencies and run stage dependencies in the data set, determining whether a compile stage dependency has been identified, determining whether the identified compile stage dependency is accessible responsive to determining that the compile stage dependency has been identified, retrieving the compile stage dependency responsive to determining that the identified compile stage dependency is accessible, and compiling the source code and saving the compiled source code in a memory using the retrieved compile stage dependency responsive to determining that no run stage dependencies have been identified.

13 Claims, 3 Drawing Sheets

(56) References Cited

U.S. PATENT DOCUMENTS

2014/0359129 A1    12/2014    Sharma

OTHER PUBLICATIONS

Dow, Eli M., Pending Application entitled: "Analysis of Source Code for Deployment" U.S. Appl. No. 15/168,714 filed May 31, 2016.
List of IBM Patents or Patent Applictions Treated as Related; (Appendix P), Filed Mar. 27, 2017, 2 pages.

* cited by examiner

ANALYSIS OF SOURCE CODE FOR DEPLOYMENT

BACKGROUND

The present invention generally relates to compiling and running code, and more specifically, to analyzing and retrieving dependencies for compiling and running code.

To compile and run some types of source code, dependencies such as, libraries and other infrastructure are often needed prior to compiling the source code such compiling stage dependencies must be available to the compiler prior to compiling the source code. Following compiling the source code, the program may need access to run stage dependencies that facilitate running the program.

SUMMARY

According to an embodiment of the present invention, a method comprises receiving a source code having a data set with a processor, opening the data set and identifying compile stage dependencies and run stage dependencies in the data set, determining whether a compile stage dependency has been identified, determining whether the identified compile stage dependency is accessible responsive to determining that the compile stage dependency has been identified, retrieving the compile stage dependency responsive to determining that the identified compile stage dependency is accessible, and compiling the source code and saving the compiled source code in a memory using the retrieved compile stage dependency responsive to determining that no run stage dependencies have been identified.

According to another embodiment of the present invention, a system comprises a memory, a display, a processor communicatively connected to the memory and the display, wherein the processor is operative to receive a source code having a data set, open the data set and identifying compile stage dependencies and run stage dependencies in the data set, determine whether a compile stage dependency has been identified, determine whether the identified compile stage dependency is accessible responsive to determining that the compile stage dependency has been identified, retrieve the compile stage dependency responsive to determining that the identified compile stage dependency is accessible, and compile the source code and saving the compiled source code in a memory using the retrieved compile stage dependency responsive to determining that no run stage dependencies have been identified.

According to another embodiment of the present invention, a computer program product comprises a computer readable storage medium having program instructions embodied therewith, the program instructions executable by a processor to cause the processor to perform a method comprises receiving a source code having a data set with a processor, opening the data set and identifying compile stage dependencies and run stage dependencies in the data set, determining whether a compile stage dependency has been identified, determining whether the identified compile stage dependency is accessible responsive to determining that the compile stage dependency has been identified, retrieving the compile stage dependency responsive to determining that the identified compile stage dependency is accessible, and compiling the source code and saving the compiled source code in a memory using the retrieved compile stage dependency responsive to determining that no run stage dependencies have been identified.

DETAILED DESCRIPTION

As discussed above, in software development, after source code is written the source code may be compiled during a compiling stage of development. Following the compiling of the source code, the program may be run during a run stage of development.

Prior to compiling source code during the source code compiling stage of development, some compilers may need access to compile stage dependencies such as, libraries, files, or other infrastructure in order to properly compile the source code.

After the source code is complied, when the program is run (during the run stage), run stage dependencies may be needed by the program to run. Run stage dependencies include, for example, use of a database library, advanced message queuing protocol, or a message service.

For a developer who, for example, is using open-source source code, determining what compile stage and run stage dependencies that are needed to effectively compile and run the program can be burdensome. The methods and systems described herein provide for heuristically analyzing the source code to determine if any compile stage dependencies exist and/or any run stage dependencies exits. If dependencies exist, the method and system is operative to retrieve the dependencies to facilitate compiling and running the code.

Figure 1:
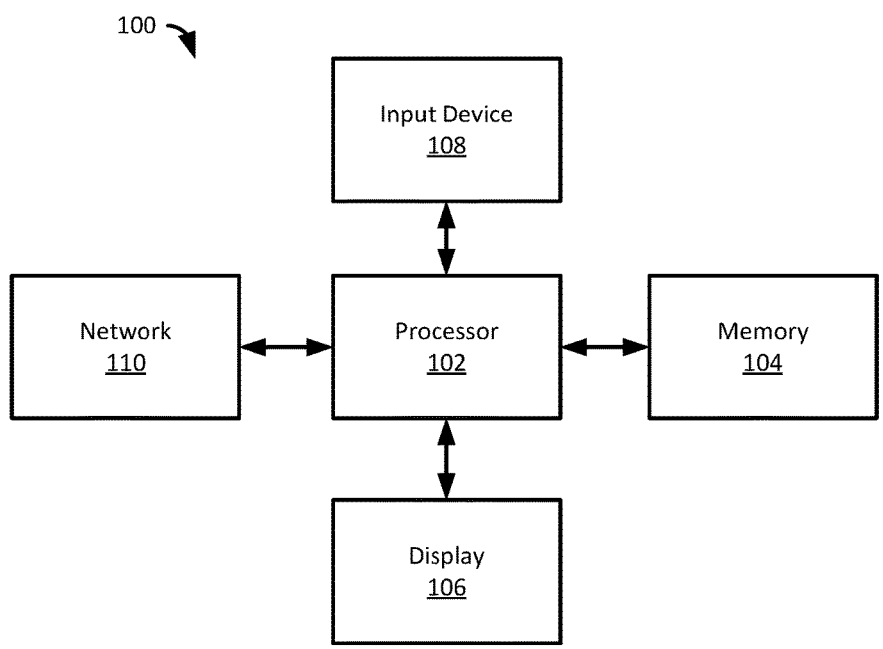
FIG. 1 illustrates an exemplary embodiment of a processing system.

FIG. 1 illustrates an exemplary embodiment of a processing system 100. The system 100 includes a processor 102 that is communicatively connected to a memory 104, a display 106, an input device 108, and a network 110. The methods described herein may be performed by the system 100.

Figure 2:
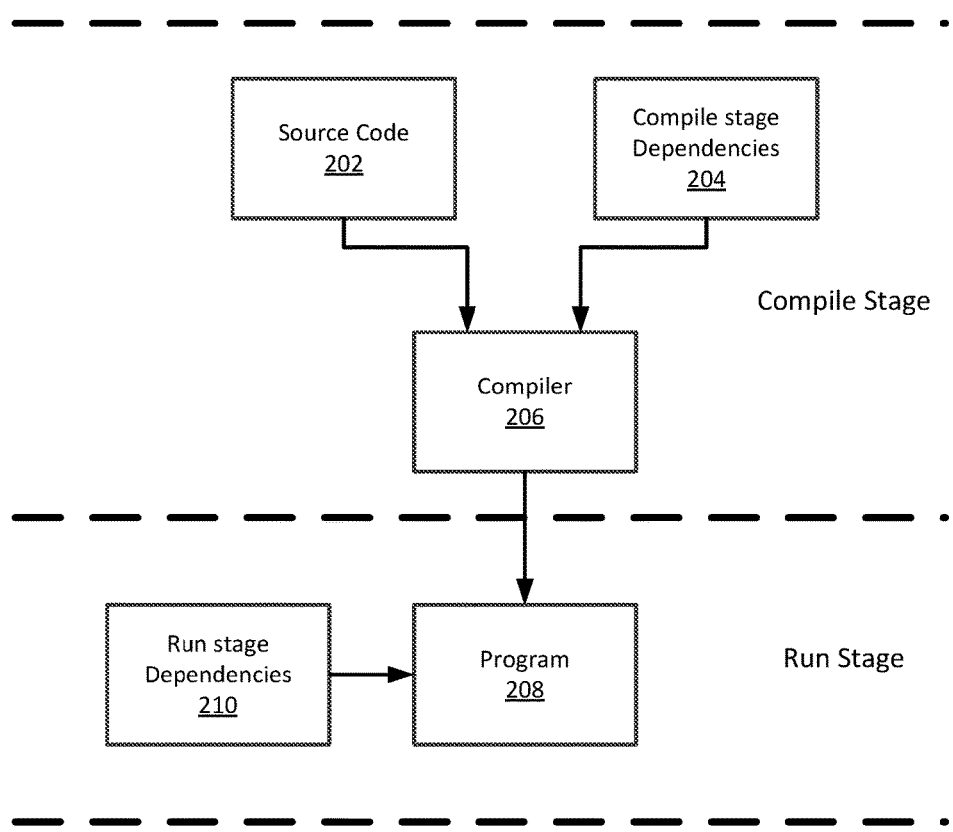
FIG. 2 illustrates a block diagram of two stages of software development.

FIG. 2 illustrates a block diagram of two stages of software development. In this regard, a compiler 206 during the compile stage receives source code 202. During compiling, the compiler 206 receives, retrieves, accesses, or stored compile stage dependencies 204, which facilitate compiling the source code 202.

After the source code 202 has been compiled, the program 208 may be run during the run stage. To run properly, the run stage dependencies 210 are retrieved, accessed, received, or stored by the program 208 when the program runs.

Figure 3:
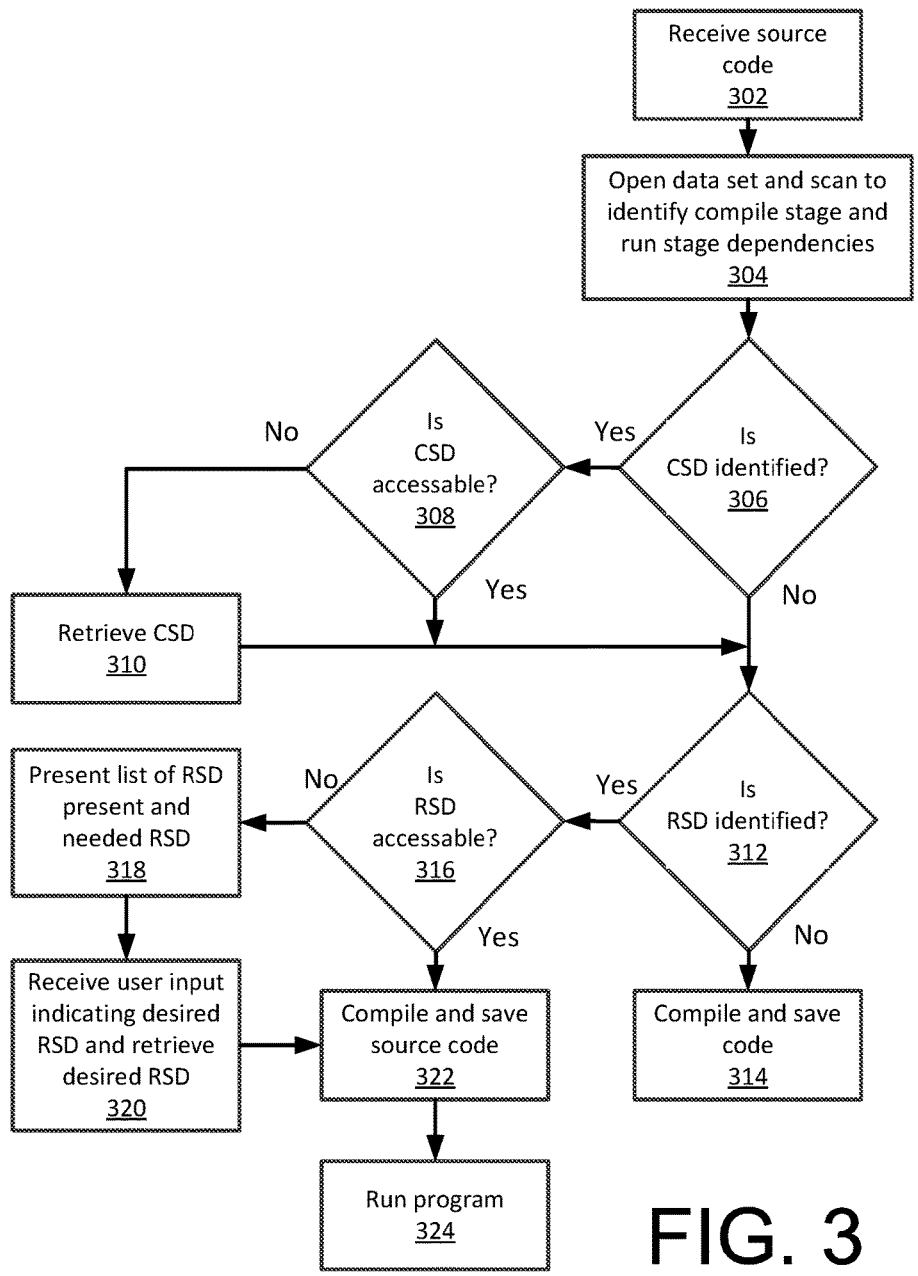
FIG. 3 illustrates a flow diagram that includes a method for identifying dependencies in code and retrieving the dependencies prior to compiling and/or running the program.

FIG. 3 illustrates a flow diagram that includes a method for identifying dependencies in code and retrieving the dependencies prior to compiling and/or running the program. In block 302 the source code is received by the processor 102 (of FIG. 1). In block 304, the source code data set is opened and scanned to identify compile stage dependencies (CSD) and run stage dependencies (RSD). The CSDs may be identified by, for example, scanning the code to identify header/include files and checking to ensure that the files or libraries associated with the header/include files are present. The system may also identify declaration of variables that use the identified classes. A RSD may be identified once a CSD is found. The program has a database that identifies the common libraries and what the common libraries are used for. The program may search through the CSDs looking for libraries that use a run-time infrastructure such as, for example, databases or messaging que systems. For example, if a CSD scan identifies a declaration for a JAVA database connectivity (JDBC) handler, the program will retrieve the libraries used by the JDBC handler. The RSD scan will check the system database and determine that the JDBC is used for databases. The RSD will allocate a database server for the user.

In block 306, the processor 102 determines whether any compile stage dependencies have been identified. If yes, the processor 102 determines whether the identified compile stage dependencies are present or available or accessible for the compiler in block 308. If no, the processor 102 retrieves or identifies addresses or other access information for the identified compile stage dependencies in block 310. In block 312, the processor 102 determines whether any run stage dependencies have been identified. If no, the processor 102 compiles and saves the compiled code in block 314. If yes, in block 316, the processor 102 determines whether the identified run stage dependencies are present or available or accessible for running the compiled program. If no, the processor 102 presents a list of the run stage dependencies to the user in block 318. If the user desires to both compile and run the program, the user may choose to enter an input indicating what run stage dependencies that the user would like the processor 102 to retrieve prior to running the program in block 320. In block 322, the processor 102 compiles and saves the code. In block 324 the processor 102 (or another processor) may run the program. The processor 102 may output to a user a summary of the retrieved compile stage dependencies and the retrieved run stage dependencies. The summary may include, for example, credentials, internet protocol addresses or other information that may be useful to the user for further development or integration of the program.

In some programs, run stage dependencies may include a database or other data structures to properly run the program during the run stage. In this regard, the processor 102 may identify such run stage dependencies (as shown in block 312 of FIG. 3). The processor 102 is operative to determine the database requirements for running the code, and in some embodiments, provision or request the generation of a database or other data structure that may be present on server and accessible via a network.

In this regard, the processor 102 may determine the parameters of the database that is identified as a run time dependency and generate a database or file structure that satisfies the run stage dependency. This run time dependency may be present on the system 100 (of FIG. 1) or externally via a cloud based or server based service. When deploying remotely, the program will change its configuration files to match the locations of the dependencies. For example, if a database is deployed onto a cloud system, the local system will need to know the location of the database as well as username and password credentials that are used to access the database. The program updates the configuration files for the project.

The methods and systems described herein provide for identifying compile stage dependencies and run stage dependencies in source code and retrieving or generating the dependencies to effectively compile and run the code.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
    a memory;
    a display;
    a processor communicatively connected to the memory and the display, wherein the processor is operative to:
    receive a source code having a data set;
    open the data set and identifying compile stage dependencies and run stage dependencies in the data set;
    determine whether a compile stage dependency has been identified;
    determine whether the identified compile stage dependency is accessible responsive to determining that the compile stage dependency has been identified;
    retrieve the compile stage dependency responsive to determining that the identified compile stage dependency is accessible; and
    compile the source code and saving the compiled source code in a memory using the retrieved compile stage dependency responsive to determining that no run stage dependencies have been identified.

2. The system of claim 1, wherein the processor is further operative to:
    determining whether a run stage dependency has been identified after determining whether the compile stage dependency has been identified; and determining whether the identified run stage dependency is accessible responsive to determining that the run stage dependency has been identified.

3. The system of claim 2, wherein the processor is further operative to present to the user on the display a description of the identified run stage dependency and an indication that the identified run stage dependency is accessible responsive to determining that the identified run stage dependency is accessible.

4. The system of claim 2, wherein the processor is further operative to present to the user on the display a description of the identified run stage dependency and an indication that the identified run stage dependency is not accessible responsive to determining that the identified run stage dependency is not accessible.

5. The system of claim 4, wherein the processor is further operative to retrieve the identified run stage dependency that is not accessible responsive to receiving a user input indicating a request to retrieve the identified run stage dependency.

6. The system of claim 5, wherein the processor is further operative to compile the source code and saving the compiled source code in a memory using the retrieved compile stage dependency responsive retrieving the identified run stage dependency.

7. The system of claim 6, wherein the processor is further operative to run the compiled source code using the identified run stage dependency responsive to retrieving the identified run stage dependency.

8. A computer program product comprising a computer readable storage medium having program instructions embodied therewith, the program instructions executable by a processor to cause the processor to perform a method comprising:
   receiving a source code having a data set with a processor;
   opening the data set and identifying compile stage dependencies and run stage dependencies in the data set;
   determining whether a compile stage dependency has been identified;
   determining whether the identified compile stage dependency is accessible responsive to determining that the compile stage dependency has been identified;
   retrieving the compile stage dependency responsive to determining that the identified compile stage dependency is accessible; and
   compiling the source code and saving the compiled source code in a memory using the retrieved compile stage dependency responsive to determining that no run stage dependencies have been identified.

9. The computer program product of claim 8, wherein the method further comprises:
   determining whether a run stage dependency has been identified after determining whether the compile stage dependency has been identified; and
   determining whether the identified run stage dependency is accessible responsive to determining that the run stage dependency has been identified.

10. The computer program product of claim 9, wherein the method further comprises presenting to the user a description of the identified run stage dependency and an indication that the identified run stage dependency is accessible responsive to determining that the identified run stage dependency is accessible.

11. The computer program product of claim 9, wherein the method further comprises presenting to the user a description of the identified run stage dependency and an indication that the identified run stage dependency is not accessible responsive to determining that the identified run stage dependency is not accessible.

12. The computer program product of claim 11, wherein the method further comprises retrieving the identified run stage dependency that is not accessible responsive to receiving a user input indicating a request to retrieve the identified run stage dependency.

13. The computer program product of claim 12, wherein the method further comprises compiling the source code and saving the compiled source code in a memory using the retrieved compile stage dependency responsive retrieving the identified run stage dependency.

* * * * *